Patented May 1, 1951

2,551,387

UNITED STATES PATENT OFFICE 2,551,387

ESTERS OF UNSATURATED FATTY ACIDS AND GLYCOL ETHERS IN COPOLYMERS OF CYCLOPENTADIENE AND UNSATURATED GLYCERIDE OILS

Eugene W. Moffett and Wallace K. Hoya, Milwaukee, Wis., assignors to Pittsburgh Plate Glass Company, Allegheny County, Pa., a corporation of Pennsylvania No Drawing. Application July 25, 1947,
Serial No. 763,750

6 Claims. (Cl. 260—23.7)

The present invention relates to the preparation of a coating composition comprising a copolymer of an unsaturated glyceride oil and a conjugate cyclic hydrocarbon and it has particular relation to the preparation of a copolymer of a drying oil such as linseed oil or soya bean oil and a cyclic diene hydrocarbon such as cyclopentadiene.

One object of the invention is to provide a coating composition having air drying characteristics similar to tung oil and being capable of drying when spread as a film to form polymers to provide surfaces of high gloss and depth.

A second object of the invention is to provide a coating composition of the above type which when pigmented with difficultly wettable pigments such as carbon blacks, para and toluidine reds, chrome greens and the like will dry quickly to a hard glossy state.

A third object of the invention is to provide a coating composition comprising a coplymer of a drying oil and a cyclic diene hydrocarbon which can readily be ground as a vehicle with pigments to provide pastes of low viscosity, improved fineness of grind, said pastes being obtained with less expenditure of work for a given fineness of grind than is required in the preparation of pastes from conventional materials.

These and other objects of the invention will be apparent from consideration of the following specification and the appended claims.

It has heretofore been suggested to copolymerize glyceride oil such as linseed oil, soya bean oil and the like unsaturated oils conventionally employed in coating compositions with a diene hydrocarbon such as cyclopentadiene or a lower polymer of cyclopentadiene such as dicyclopentadiene. The oil and the hydrocarbon by reason of unsaturation in the molecular structure thereof, unite to provide products which body and dry substantially more readily than the conventional oils which have not been so treated. It is thus possible to obtain from oils of relatively poor air drying characteristics products resembling in drying powers, tung oils or other oils possessing a capacity for rapid air drying.

It has also been suggested to incorporate large amounts of the diene hydrocarbons with lesser amounts of the oil and then to copolymerize the mixture, for example by heat and pressure methods in an autoclave to obtain resins soluble in oils and petroleum hydrocarbons. These resins could be incorporated with ordinary products of enhanced bodying and drying characteristics.

Although the oils modified by diene hydrocarbons such as cyclopentadiene or dicyclopentadiene are of superior drying characteristics for certain applications, they are not entirely satisfactory for some applications because of the low wetting powers thereof for certain pigments. That is, oils containing the copolymers would not readily wet certain pigmentary materials such as carbon black, toluidine reds, chrome greens and the like. The pigments and the modified oils were difficult to grind together and resulted in pastes of relatively high viscosity which were not entirely satisfactory as to gloss and surface when reduced to enamels.

The present invention is based upon the discovery that the foregoing difficulties encountered with coating compositions embodying drying oils and copolymers of an unsaturated glyceride oil and cyclic diene hydrocarbons such as dicyclopentadiene, can be substantially obviated or at least mitigated by incorporation of esters of fatty acids and ether type glycols, usually in comparatively small amounts with the oils containing the copolymers.

The preparation of esters of ether type glycols and fatty acids suitable for incorporation with the copolymers follows along substantially conventional lines as they are employed in the preparation of esters in general. The desired esters may be obtained by heating together an ether glycol such as di-, tri-, tetra-, or other polyglycol and a fatty acid such as linseed oil acid, e. g. linolenic acid, linoleic acid, oleic acid or mixtures of two or more of these acids in an autoclave. A solvent should be employed for example, 10 to 50% of toluol or xylene based upon the total reaction mixture. The mixture in the autoclave should be heated under an inert atmosphere such as carbon dioxide.

The reaction mixture may include approximately one mol of the fatty acid per mol of the ether type glycol or it may include two moles of the acid to one mol of glycol depending upon whether or not it is desired to prepare the diester or the mono-ester. Usually a small amount e. g. 1 to 10% of the glycol in excess of that theoretically required will be employed. The temperature should be sufficiently high to effect esterification, that is, to evolve water of reaction. This can easily be condensed by passing vapors from the reaction vessel through a suitable condenser and constitutes a criterion that the reaction temperature has been attained. A temperature of 170 to 200° C. is usually satisfactory though temperatures somewhat lower than this may be employed, for example, the temperature may be as low as 150° C. or thereabouts but such long periods of time are required for the reaction that this would not usually be economical. On the other hand, the temperature may be raised, for example to 300 or 320° or to any other temperature below that at which excessive vaporization, decomposition or discoloration of the reactants or the product is likely to occur. At 170 to 220° C. the esterification reaction will be completed within 4 to 6 hours. Longer periods of esterification, e. g. 12 to 14 hours are also contemplated. The water of reaction is separated off as it is evolved. The cessation of its evolution constitutes a criterion of the completion of the esterification. Finally the solvent is eliminated by evaporation and blowing with an inert atmosphere to obtain the ester product contemplated for use in the practice of the present invention.

As previously indicated, the invention contemplates the use of either the half esters or the diesters of the glycolic compound and the fatty acids. The glycolic compounds include diethylene glycol, triethylene glycol, tetraethylene glycol and the higher derivatives obtained by intercondensation of the glycol molecules through elimination of water to provide ether linkages. The molecular weight of the glycols may, for example, be as high as 1000 or even 2000. These products are of the type formula

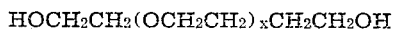

$HOCH_2CH_2(OCH_2CH_2)_xCH_2CH_2OH$

X may be from 1 to 50. Such products are wax like in nature and are sold under the trade names of "Carbowaxes." The corresponding ether type condensation products of the propylene glycols, e. g. of 1,2 or 1,3 propylene glycol are also contemplated in place of the ether type condensation products of ethylene glycol. The monoethers such as the monomethyl, monoethyl, monopropyl, monobutyl, or monoamyl ethers of such glycol condensation products as di- or triethylene glycol are also contemplated, since the hydroxy groups of the monoethers are susceptible of condensation with higher fatty acids such as linseed oil fatty acids to form monoesters which are useful in the practice of the present invention. The ester of any of the foregoing hydroxy ethers and fatty acids may be employed in amounts of 1 to 10% or thereabouts of the polymerizable mixture.

Example 1

In a specific example illustrating the practice of the invention, a polyglycol, e. g. the ether polymer of ethylene glycol was heated to a temperature of 170 to 220° C. for 10 hours under an atmosphere of carbon dioxide and in the presence of xylene with linseed oil fatty acids. The water was allowed to evaporate off as it was formed, the solvent being condensed and returned to the reaction mixture. At the end of the reaction, when the acid value had reached the point within a range of about 5 to 30, the reaction was discontinued and residual solvent was blown out with insert gas.

The ester product, e. g. the ester of linseed oil and "Carbitol" (monoethyl ether of diethylene glycol), was admixed with linseed oil in a ratio of 3 parts by weight to 58.5 parts of the linseed oil. Thirty-eight and one-half parts of dicyclopentadiene were included in the mixture and the mixture was heated in an autoclave at a temperature of about 275° for 4 hours. The reaction product was then taken from the autoclave and thinned with an equal weight of petroleum naphtha to give a vehicle of a body of G as determined by the Gardner Holdt scale.

The resultant vehicle could be ground with pigments such as chrome green or the like. The mixture of 50.5 parts of the vehicle and 49.5 parts of the chrome green pigment resulted in a paste which was soft, limpid and fluid. A paste made from a control vehicle containing a copolymer of linseed oil and dicyclopentadiene but not containing the ester of a drying oil acid and a polyglycol was highly thixotropic, livery and extremely heavy. A paste made up as above described from the improved copolymer containing said ester was admixed with appropriate thinners such as petroleum naphtha thinners in a ratio of 25 parts of paste to 75 parts of the above copolymer to provide a fluid composition which was brushed on steel panels and air dried. The resultant panels were of superior gloss, clarity and depth. There was less flooding and less seediness than with similar compositions prepared by conventional methods. For spray application, thinner such as naphtha may be added to attain suitable viscosity. The paste prepared by grinding the pigment with any of the ester modified copolymers herein described may also be thinned by addition of unmodified polymers of drying oils and cyclo or dicyclopentadiene.

Example II

In this example a mixture of 59.7 parts of linseed oil and 1.8 parts of the semi ester of "Carbowax 1000" (the higher ether type condensation product of ethylene glycol) and linseed or soya bean acids together with 38.5 parts of cyclopentadiene was placed in the autoclave and heated to a temperature of 275° C. for 3½ hours. The reaction product was taken from the autoclave and thinned with equal weight of petroleum naphtha to give a vehicle body of G. Pastes were prepared as in Example I. The resultant enamels obtained by application of the pastes possessed the same superior properties as obtained from the pastes of Example I.

Example III

A mixture of 59.7 parts of linseed oil and 1.8 parts of the diester of "Carbowax 1000" and linseed oil acids and 38.5 parts of dicyclopentadiene was placed in an autoclave and heated to 275° C. for 4 hours. The reaction product was taken from the autoclave and thinned with an equal weight of petroleum naphtha to give a vehicle of a body of G. Pastes were prepared from the vehicle in accordance with the procedures outlined in connection with Example I. The enamel coatings obtained by application of the paste were of the same superior properties as those obtained with those in connection with Example I.

It is to be understood that the coating compositions as described in connection with Examples I, II and III may include conventional paint driers such as the compounds of lead, chromium, cobalt, nickel, manganese and the like. Among the driers most popular at the present time may include cobalt naphthenate and cobalt oleate but the derivatives such as the corresponding derivatives of lead, chromium, nickel, etc. of the other metals are also useful. The invention contemplates the use of these driers in practically any proportion commonly employed in the paint industry or which may be economical. The percentages of metal content will range between 0.001 and 0.2% based on the total solids of the solution but usually will fall between 0.02 and 0.05%.

Considerable variation in the proportioning of the diene hydrocarbons, e. g. dicyclopentadiene and the oil are contemplated as being within purview of the invention. In some instances the hydrocarbons may be as low as 5% of the oil-hydrocarbon mixture. On the other hand it may constitute up to 60 or 70% of the mixture. The products as obtained by use of high ratios of hydrocarbons are more adapted for cooking with additional oil to provide varnishes. On the other hand, the oils containing only small amounts of dicyclopentadiene or its equivalent of cyclopentadiene or the lower polymers up to the pentamer are already of long oil length and may be used as drying oils. They body more readily than conventional oils, also dry more rapidly when spread as films. The long oil products may be incorporated with additional oil soluble resins or gums such as alkyd resins, ester gums, rosin, copal and others.

The forms of the invention herein described are to be considered as being by way of example. It will be apparent to those skilled in the art that numerous modifications may be made therein without departure from the spirit of the invention or the scope of the appended claims.

We claim:

1. A method of obtaining copolymers of a mixture of 30 to 95% of drying oils and 5 to 70% of cyclic diene hydrocarbons of a class consisting of cyclopentadiene and lower polymers thereof which process comprises polymerizing the oil and the hydrocarbon under heat and pressure in the presence of 1 to 10%, an ester of polyethylene glycol and an unsaturated fatty acid of a natural glyceride oil.

2. As a new material, the copolymer of (A) an unsaturated glyceride oil, (B) a compound of a class consisting of cyclopentadiene and lower homopolymers thereof up to the pentamer, compound B constituting 5 to 70% of the mixture of components A and B and (C) 1 to 10% based upon the polymerizable mixture of an ester of diethylene glycol and an unsaturated fatty acid of a glyceride oil.

3. As a new composition, the copolymer of components: (A) an unsaturated glyceride drying oil, (B) a compound of a class consisting of cyclopentadiene and lower polymers thereof up to the petamer, component B constituting 5 to 70% of the mixture of components A and B and (C) 1 to 10% based upon the polymerizable mixture of an ester of a polyglycol and an unsaturated fatty acid of a drying glyceride oil.

4. As a new material, the copolymer of components: (A) an unsaturated glyceride drying oil, (B) a compound of a class consisting of cyclopentadiene and lower polymers thereof up to the pentamer, component B constituting 5 to 70% of the mixture of components A and B and (C) 1 to 10% based upon the polymerizable mixture of an ester of a polyethylene glycol and an unsaturated fatty acid of a drying glyceride oil.

5. A process as defined in claim 4 in which the drying oil is linseed oil.

6. A process as defined in claim 4 in which the drying oil is soya bean oil.

EUGENE W. MOFFETT.
WALLACE K. HOYA.

REFERENCES CITED

The following references are of record in the file of this patent:

UNITED STATES PATENTS

| Number | Name | Date |
| --- | --- | --- |
| 2,387,895 | Gerhardt | Oct. 30, 1945 |
| 2,392,732 | Gerhardt | Jan. 8, 1946 |